United States Patent
Fu et al.

(10) Patent No.: US 12,004,274 B2
(45) Date of Patent: Jun. 4, 2024

(54) DATA PROCESSING METHOD OF DRIVING CIRCUIT AND DRIVING CIRCUIT

(71) Applicant: Shenzhen China Star Optoelectronics Semiconductor Display Technology Co., Ltd., Guangdong (CN)

(72) Inventors: Jianguo Fu, Guangdong (CN); Taijiun Hwang, Guangdong (CN); Pengfei Liang, Guangdong (CN); Bo Yang, Guangdong (CN)

(73) Assignee: Shenzhen China Star Optoelectronics Semiconductor Display Technology Co., Ltd., Guangdong (CN)

( * ) Notice: Subject to any disclaimer, the term of this patent is extended or adjusted under 35 U.S.C. 154(b) by 958 days.

(21) Appl. No.: 16/963,304

(22) PCT Filed: Jun. 3, 2020

(86) PCT No.: PCT/CN2020/094175
§ 371 (c)(1),
(2) Date: Jul. 20, 2020

(87) PCT Pub. No.: WO2021/227151
PCT Pub. Date: Nov. 18, 2021

(65) Prior Publication Data
US 2023/0145294 A1    May 11, 2023

(30) Foreign Application Priority Data
May 9, 2020  (CN) .......................... 202010388640.X

(51) Int. Cl.
*H05B 45/30* (2020.01)
*G09G 3/32* (2016.01)

(52) U.S. Cl.
CPC ............... *H05B 45/30* (2020.01); *G09G 3/32* (2013.01); *G09G 2310/08* (2013.01)

(58) Field of Classification Search
CPC ........ H05B 45/30; H05B 45/50; H05B 45/20; H05B 45/58; G09G 2310/08; G09G 3/32; G09G 3/20; Y02B 20/40
See application file for complete search history.

(56) References Cited

U.S. PATENT DOCUMENTS

2007/0120805 A1* 5/2007 Yi ........................ G09G 3/3696
345/100
2011/0310135 A1   12/2011 Fong
(Continued)

FOREIGN PATENT DOCUMENTS

| CN | 101841901 | 9/2010 |
| CN | 108346404 | 7/2018 |

(Continued)

*Primary Examiner* — Muhammad N Edun
(74) *Attorney, Agent, or Firm* — PV IP PC; Wei Te Chung; Zhigang Ma

(57) ABSTRACT

A data processing method of a driving circuit and a driving circuit are provided. Wherein, the data processing method of the driving circuit can include obtaining a timing parameter, performing data processing based on the timing parameter and obtaining a first processing result, decoding the first processing result according to a preset reference voltage and obtaining a second processing result, and amplifying the second processing result, and outputting an amplified second processing result.

17 Claims, 4 Drawing Sheets

(56) References Cited

U.S. PATENT DOCUMENTS

2018/0061344 A1\* 3/2018 Kurokawa ............ G09G 3/3648
2018/0268780 A1\* 9/2018 Bae ........................ G09G 5/026

FOREIGN PATENT DOCUMENTS

| CN | 109147716 | 1/2019 |
| CN | 110021263 | 7/2019 |
| CN | 110706637 | 1/2020 |

\* cited by examiner

DATA PROCESSING METHOD OF DRIVING CIRCUIT AND DRIVING CIRCUIT

RELATED APPLICATIONS

This application is a National Phase of PCT Patent Application No. PCT/CN2020/094175 having International filing date of Jun. 3, 2020, which claims the benefit of priority of the Chinese Patent Application No. 202010388640.X filed on May 9, 2020. The contents of the above applications are all incorporated by reference as if fully set forth herein in their entirety.

FIELD AND BACKGROUND OF THE INVENTION

The present application relates to the field of display technology, and especially to a data processing method of a driving circuit and a driving circuit.

Because micro light-emitting diodes (micro-LEDs) have high efficiency, low power consumption, and high reliability, they have gradually become popular in the market. Conventional micro-LEDs are mostly formed via a transfer printing technique, on substrates with a driving circuit, and are driven by the driving circuit to realize light emission and display.

However, during operation, there is a problem where micro-LEDs that adopt a conventional driving circuit experience color shifting over time.

SUMMARY OF THE INVENTION

During operation, a problem of color shift happens to micro-LEDs adopting a conventional driving circuit as time passing by.

Embodiments of the present application provide a data processing method of a driving circuit and a driving circuit that can resolve the problem of color shift happening to micro-LEDs as time passing by.

As a first aspect, embodiments of the present application provide a data processing method of a driving circuit that includes:

Obtaining a timing parameter;

Performing data processing based on the timing parameter, and obtaining a first processing result;

Decoding the first processing result according to a preset reference voltage, and obtaining a second processing result; and Amplifying the second processing result, and outputting the amplified second processing result.

In the data processing method of the driving circuit according to an embodiment of the present application, the step of performing the data processing based on the timing parameter, and obtaining the first processing result includes:

Performing a signal initialization processing and an attenuation processing based on the timing parameter, and obtaining the first processing result.

In the data processing method of the driving circuit according to an embodiment of the present application, the timing parameter includes a data processing time length, an initialization time length, and a maximum counting value; and The step of performing the signal initialization processing and the attenuation processing based on the timing parameter, and obtaining the first processing result includes:

Performing the signal initialization processing and the attenuation processing based on the data processing time length, the initialization time length, and the maximum counting value, and obtaining the first processing result.

In the data processing method of the driving circuit according to an embodiment of the present application, the step of performing the signal initialization processing and the attenuation processing based on the data processing time length, the initialization time length, and the maximum counting value, and obtaining the first processing result includes:

Performing the signal initialization processing according to a preset initialization start time and the initialization time length, and obtaining an initial input signal; and Performing the attenuation processing on the initial input signal according to the preset initialization start time, the initialization time length, the data processing time length, and the maximum counting value, and obtaining an attenuation signal;

Wherein the initial input signal and the attenuation signal are the first processing result.

In the data processing method of the driving circuit according to an embodiment of the present application, the step of performing the attenuation processing on the initial input signal according to the preset initialization start time, the initialization time length, the data processing time length, and the maximum counting value, and obtaining the first processing result includes:

Performing a first sub-attenuation processing on the initial input signal based on the preset initialization start time, the initialization time length, and the maximum counting value, and obtaining a first sub-attenuation signal;

Determining a data processing end time according to the preset initialization start time and the data processing time length; and Comparing the data processing end time with a corresponding maximum counting value time to determine the first processing result according to a comparison result.

In the data processing method of the driving circuit according to an embodiment of the present application, the step of determining the first processing result according to the comparison result includes:

If the data processing end time is equal to the corresponding maximum counting value time, then the initial input signal and the first sub-attenuation signal are the first processing result; and If the data processing end time is greater than the corresponding maximum counting value time, then performing a second sub-attenuation processing on the first sub-attenuation signal, and obtaining a second sub-attenuation signal, wherein the initial input signal, the first sub-attenuation signal, and the second sub-attenuation signal are the first processing result.

In the data processing method of the driving circuit according to an embodiment of the present application, the step of performing the second sub-attenuation processing on the first sub-attenuation signal, and obtaining the second sub-attenuation signal includes:

Setting the first sub-attenuation signal to zero, and obtaining the second sub-attenuation signal.

In the data processing method of the driving circuit according to an embodiment of the present application, the step of performing the first sub-attenuation processing on the initial input signal based on the preset initialization start time, the initialization time length, and the maximum counting value includes:

Determining the corresponding maximum counting value time according to the preset initialization start time and the maximum counting value; and Performing the first sub-attenuation processing on the initial input signal according to the preset initialization start time, the initialization time length, and the corresponding maximum counting value time.

In the data processing method of the driving circuit according to an embodiment of the present application, the step of decoding the first processing result according to the preset reference voltage, and obtaining the second processing result includes:

Performing a digital-to-analog conversion to the first processing result according to the preset reference voltage to convert a digital signal into an analog signal, and obtaining the second processing result.

In the data processing method of the driving circuit according to an embodiment of the present application, the step of performing the digital-to-analog conversion to the first processing result according to the preset reference voltage to convert the digital signal into the analog signal, and obtaining the second processing result includes:

Comparing the preset reference voltage with the first processing result to convert the digital signal into the analog signal, thereby obtaining the second processing result.

As a second aspect, embodiments of the present application provide a driving circuit that includes:

A controller configured to obtain a timing parameter, perform data processing based on the timing parameter, and obtain a first processing result;

A decoder configured to decode the first processing result according to a preset reference voltage and obtain a second processing result; and A proportional amplifier configured to amplify the second processing result and output the amplified second processing result.

In the driving circuit according to embodiments of the present application, the controller includes:

A timing module configured to obtain the timing parameter; and

A data processing module configured to perform the data processing based on the timing parameter and obtain the first processing result.

In the driving circuit according to embodiments of the present application, the timing parameter includes a data processing time length, an initialization time length, and a maximum counting value; and The data processing module is configured to:

Perform a signal initialization processing and an attenuation processing based on the data processing time length, the initialization time length, and the maximum counting value, and obtain the first processing result.

In the driving circuit according to embodiments of the present application, the data processing module is configured to:

Perform the signal initialization processing according to a preset initialization start time and the initialization time length, and obtain an initial input signal; and Perform the attenuation processing on the initial input signal according to the preset initialization start time, the initialization time length, the data processing time length, and the maximum counting value, and obtain an attenuation signal;

Wherein the initial input signal and the attenuation signal are the first processing result.

In the driving circuit according to embodiments of the present application, the data processing module is configured to:

Perform the signal initialization processing according to the preset initialization start time and the initialization time length, and obtain the initial input signal;

Perform a first sub-attenuation processing on the initial input signal based on the preset initialization start time, the initialization time length, and the maximum counting value, and obtain a first sub-attenuation signal;

Determine a data processing end time according to the preset initialization start time and the data processing time length; and Compare the data processing end time with a corresponding maximum counting value time to determine the first processing result according to a comparison result.

In the driving circuit according to embodiments of the present application, the data processing module is configured to:

Perform the first sub-attenuation processing on the initial input signal based on the preset initialization start time, the initialization time length, and the maximum counting value, and obtain the first sub-attenuation signal;

Determine the data processing end time according to the preset initialization start time and the data processing time length;

Compare the data processing end time with the corresponding maximum counting value time;

If the data processing end time is equal to the corresponding maximum counting value time, then let the initial input signal and the first sub-attenuation signal be the first processing result; and If the data processing end time is greater than the corresponding maximum counting value time, then perform a second sub-attenuation processing on the first sub-attenuation signal, and obtain a second sub-attenuation signal, wherein the initial input signal, the first sub-attenuation signal, and the second sub-attenuation signal are the first processing result.

In the driving circuit according to embodiments of the present application, the data processing module is configured to:

Perform the first sub-attenuation processing on the initial input signal based on the preset initialization start time, the initialization time length, and the maximum counting value, and obtain the first sub-attenuation signal;

Determine the data processing end time according to the preset initialization start time and the data processing time length;

Compare the data processing end time with the corresponding maximum counting value time;

If the data processing end time is equal to the corresponding maximum counting value time, then let the initial input signal and the first sub-attenuation signal be the first processing result; and If the data processing end time is greater than the corresponding maximum counting value time, then set the first sub-attenuation signal to zero, and obtain the second sub-attenuation signal, wherein the initial input signal, the first sub-attenuation signal, and the second sub-attenuation signal are the first processing result.

In the driving circuit according to embodiments of the present application, the data processing module is configured to:

Perform the signal initialization processing according to the preset initialization start time and the initialization time length, and obtain the initial input signal;

Determine the corresponding maximum counting value time according to the preset initialization start time and the maximum counting value;

Perform the first sub-attenuation processing on the initial input signal according to the preset initialization start time, the initialization time length, and the corresponding maximum counting value time, and obtain the first sub-attenuation signal;

Determine the data processing end time according to the preset initialization start time and the data processing time length; and Compare the data processing end time with the corresponding maximum counting value time to determine the first processing result according to the comparison result.

In the driving circuit according to embodiments of the present application, the decoder is configured to:

Perform a digital-to-analog conversion to the first processing result according to the preset reference voltage to convert a digital signal into an analog signal, and obtain the second processing result.

In the driving circuit according to embodiments of the present application, the decoder is configured to:

Compare the preset reference voltage with the first processing result to convert the digital signal into the analog signal, thereby obtaining the second processing result.

A data processing method of a driving circuit according to embodiments of the present application includes obtaining a timing parameter; performing data processing based on the timing parameter, and obtaining a first processing result; decoding the first processing result according to a preset reference voltage, and obtaining a second processing result; and amplifying the second processing result, and outputting the amplified second processing result. A time-varying voltage signal can be produced through the present approach, thereby resolving a problem of color shift occurring in micro-LEDs as time passing by.

BRIEF DESCRIPTION OF THE SEVERAL VIEWS OF THE DRAWINGS

The accompanying figures to be used in the description of embodiments of the present application will be described in brief to more clearly illustrate the technical solutions of the embodiments. The accompanying figures described below are only part of the embodiments of the present application, from which figures those skilled in the art can derive further figures without making any inventive efforts.

DESCRIPTION OF SPECIFIC EMBODIMENTS OF THE INVENTION

The embodiments of the present application are described in detail hereinafter. Examples of the described embodiments are given in the accompanying drawings. It should be noted that the following embodiments are intended to illustrate and interpret the present application, and shall not be construed as causing limitations to the present application. Similarly, the following embodiments are part of the embodiments of the present application and are not the whole embodiments, and all other embodiments obtained by those skilled in the art without making any inventive efforts are within the scope protected by the present application.

Embodiments of the present application provide a data processing method of a driving circuit and a driving circuit, which will be described in detail separately in the following.

Figure 1:
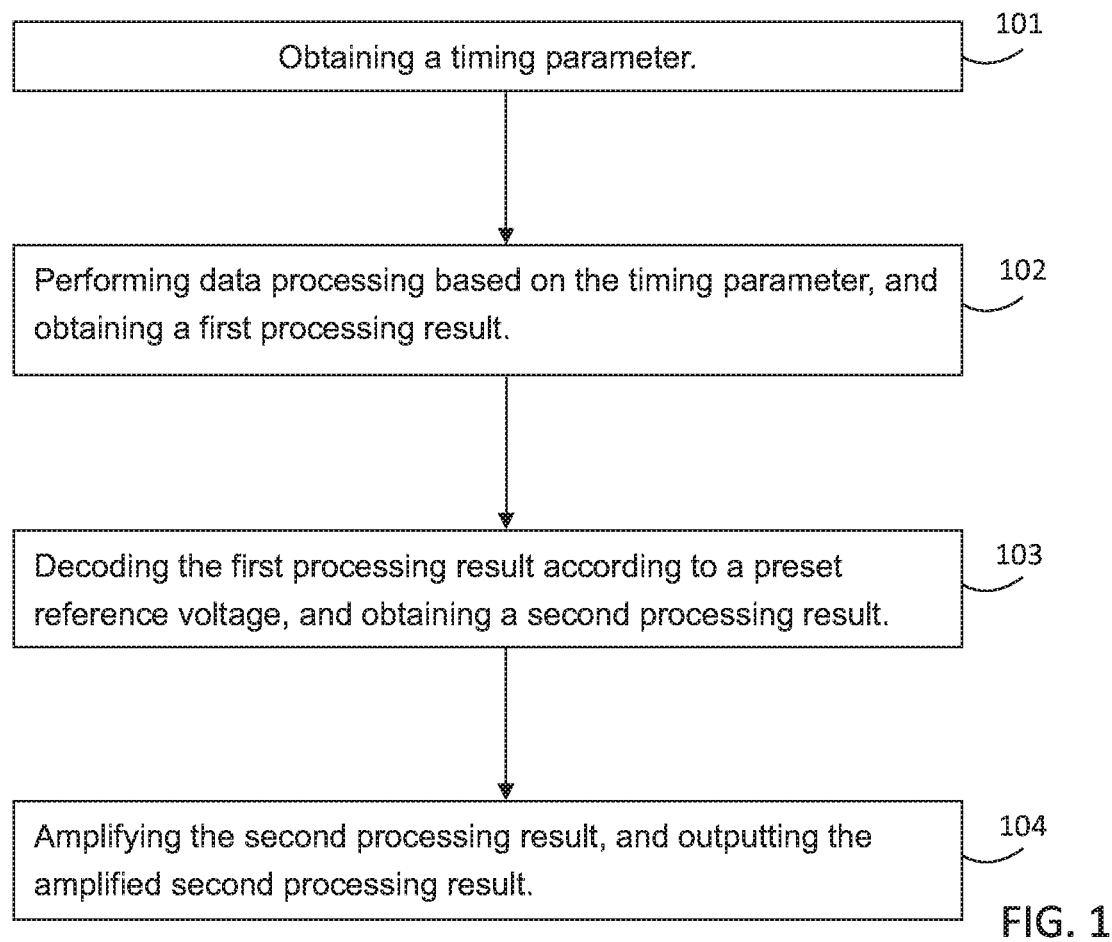
FIG. 1 is a flowchart of a data processing method of a driving circuit according to an embodiment of the present application.
Figure 5:
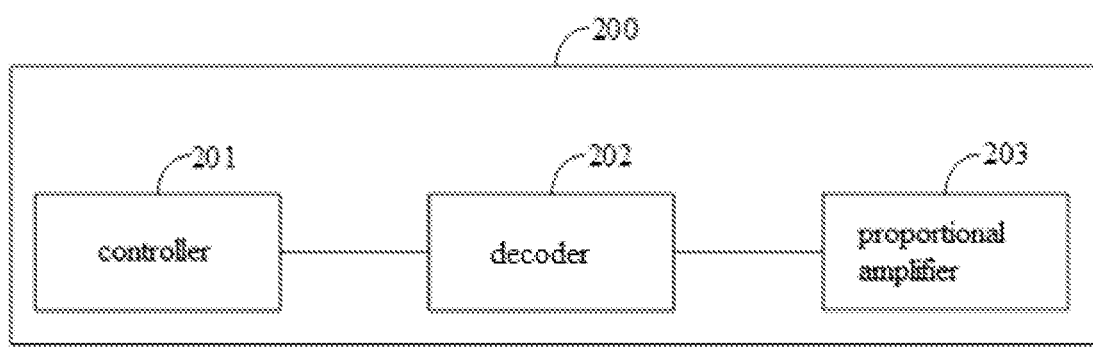
FIG. 5 is a structural schematic diagram of a driving circuit according to an embodiment of the present application.
Figure 6:
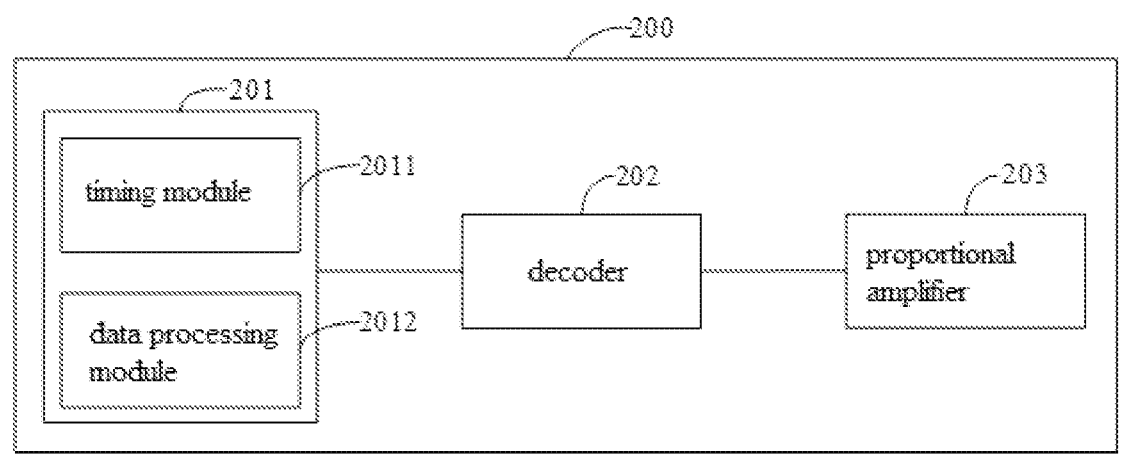
FIG. 6 is a structural schematic diagram of another driving circuit according to an embodiment of the present application.

Referring to FIG. 1, FIG. 1 is a data processing method of a driving circuit according to an embodiment of the present application. The data processing method of the driving circuit can be applied in a driving circuit as shown in FIG. 5 or FIG. 6. A specific process of the data processing method of the driving circuit can be the following:

101, obtaining a timing parameter.

Wherein, the timing parameter can include a data processing time length, an initialization time length, and a maximum counting value.

Figure 2:
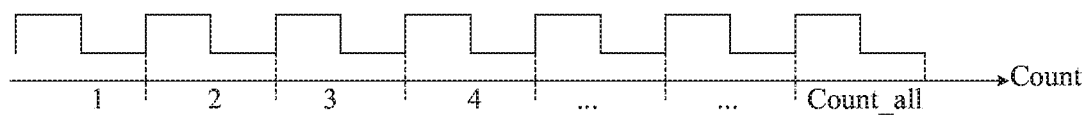
FIG. 2 is a structural schematic diagram of a digital signal according to an embodiment of the present application.

Wherein, the maximum counting value can be a number of a digital quantity provided by a controller 201 of a driving circuit 200. It can be understood that, during a specific operation course, the controller 201 can encode the digital quantity and form a digital signal as shown in FIG. 2. Wherein, Count_all is the maximum counting value.

102, performing data processing based on the timing parameter and obtaining a first processing result.

Wherein, data processing can specifically include signal initialization processing and attenuation processing. That is, the step "performing data processing based on the timing parameter and obtaining the first processing result" can include:

Performing signal initialization processing and attenuation processing based on the timing parameter and obtaining the first processing result.

Specifically, signal initialization processing and attenuation processing can be performed based on the data processing time length, the initialization time length, and the maximum counting value to obtain the first processing result.

It should be explained that, in description of the present application, terms "first", "second", "third", etc. are used simply for purpose of description and cannot be understood to mean or suggest relative importance or implicitly indicate an amount of the technical features. Therefore, features with terms "first", "second", and "third" can mean or implicitly include one or more of the features.

It should be explained that a substantial data processing procedure is that, under an effect of a timing module 2011, a data processing module 2012 of the controller 201 transmits a corresponding digital signal to a decoder 202 based on a preset initialization start time, the timing parameter, and a preset time interval. Wherein, the preset initialization start time can be set according to practical conditions. The preset initialization start time is a data processing start time. Under general conditions, before commencing data processing, the controller 201 would be reset. Therefore, the preset initialization start time can be a controller 201 reset time.

In some embodiments, the step "performing signal initialization processing and attenuation processing based on the data processing time length, the initialization time length, and the maximum counting value, and obtaining the first processing result" can include:

Performing signal initialization processing according to the preset initialization start time and the initialization time length, and obtaining an initial input signal; and Performing attenuation processing on the initial input signal according to the preset initialization start time, the initialization time length, the data processing time length, and the maximum counting value, and obtaining an attenuation signal;

Wherein, the initial input signal and the attenuation signal are the first processing result.

Figure 3:
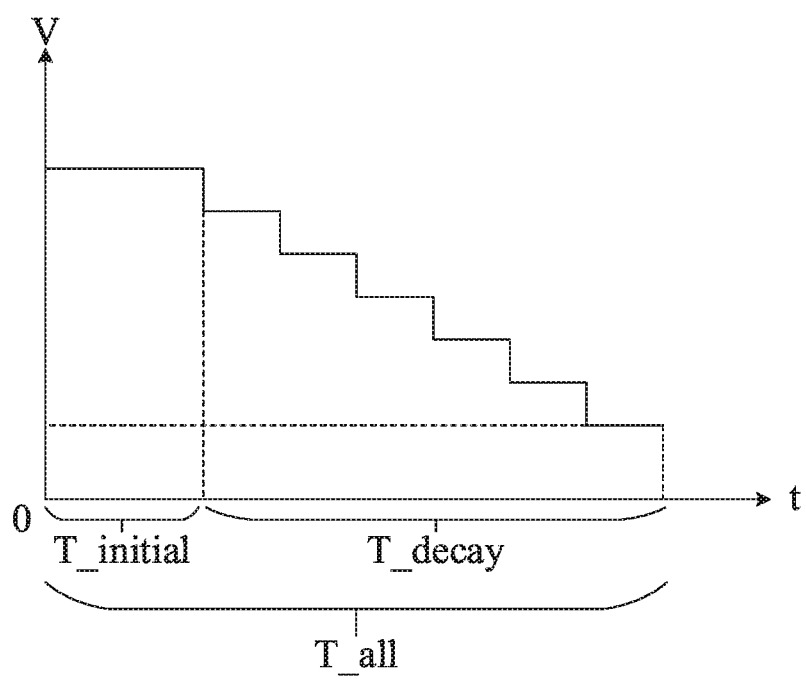
FIG. 3 is a structural schematic diagram of a first processing result according to an embodiment of the present application.

As shown in FIG. 3, specifically, a stage to which an initialization time length T_initial in FIG. 3 corresponds is signal initialization processing, and a signal to which T_initial corresponds is the initial input signal. A stage to which an attenuation processing time length T_decay corresponds is attenuation processing, and a signal to which T_decay corresponds is the attenuation signal. A stage to which a data processing time length T_all corresponds is data processing, and a signal to which T_all corresponds is the first processing result. As can be seen from FIG. 3, the initial input signal and the attenuation signal are successive, and the first processing result includes the initial input signal and the attenuation signal.

It can be understood that the data processing time length is equal to a sum of the initialization time length and the attenuation time length. Therefore, given the data processing time length and the initialization time length, the attenuation time length can be obtained.

In some embodiments, the step "performing the attenuation processing on the initial input signal according to the preset initialization start time, the initialization time length, the data processing time length, and the maximum counting value, and obtaining the attenuation signal" can include:

Performing a first sub-attenuation processing on the initial input signal based on the preset initialization start time, the initialization time length, and the maximum counting value, and obtaining a first sub-attenuation signal;

Determining a data processing end time according to the preset initialization start time and the data processing time length; and Comparing the data processing end time with a corresponding maximum counting value time to determine the first processing result according to a comparison result.

It can be understood that the data processing procedure substantially means to output at least a digital quantity of the maximum counting value according to the preset initialization start time, the timing parameter, and the preset time interval. Therefore, the corresponding maximum counting value time can be equal to or less than the data processing end time. Wherein, the data processing end time can be obtained according to the preset initialization start time and the data processing time length.

It can be understood that a digital signal is transmitted to the decoder 202 by the timing module 2011 according to the preset initialization start time, the timing parameter, and the preset time interval. Therefore, given the preset initialization start time and the maximum counting value, the corresponding maximum counting value time can be determined.

In some embodiments, the step "determining the first processing result according to the comparison result" can include:

If the data processing end time is equal to the corresponding maximum counting value time, then the initial input signal and the first sub-attenuation signal are the first processing result; and If the data processing end time is greater than the corresponding maximum counting value time, then performing a second sub-attenuation processing on the first sub-attenuation signal, and obtaining a second sub-attenuation signal, wherein the initial input signal, the first sub-attenuation signal, and the second sub-attenuation signal are the first processing result.

It should be explained that, in some embodiments, when the data processing end time is greater than the corresponding maximum counting value time, the digital signal output subsequently can be set to zero. That is, the step "performing the second sub-attenuation processing on the first sub-attenuation signal, and obtaining the second sub-attenuation signal" can include:

Setting the first sub-attenuation signal to zero, and obtaining the second sub-attenuation signal.

In some embodiments, the step "performing the first sub-attenuation processing on the initial input signal based on the preset initialization start time, the initialization time length, and the maximum counting value" can include:

Determining the corresponding maximum counting value time according to the preset initialization start time and the maximum counting value; and Performing the first sub-attenuation processing on the initial input signal according to the preset initialization start time, the initialization time length, and the corresponding maximum counting value time.

It should be explained that a first sub-attenuation processing end time is equal to the corresponding maximum counting value time. Therefore, given the corresponding maximum counting value time, the preset initialization start time, and the initialization time length, a start time of the first sub-attenuation processing can be determined. Therefore, the first sub-attenuation processing can be performed to the initial input signal according to the start time of the first sub-attenuation processing and the corresponding maximum counting value time.

103, decoding the first processing result according to a preset reference voltage, and obtaining a second processing result.

Specifically, the decoder 202 can perform a digital-to-analog conversion on the first processing result according to the preset reference voltage to convert a digital signal into an analog signal and obtain the second processing result. Specifically, the preset reference voltage can be compared with the first processing result, thereby obtaining the second processing result.

Wherein, the preset reference voltage can be provided by a power management integrated circuit (PMIC) to the decoder 202.

104, amplifying the second processing result, and outputting the amplified second processing result.

Figure 4:
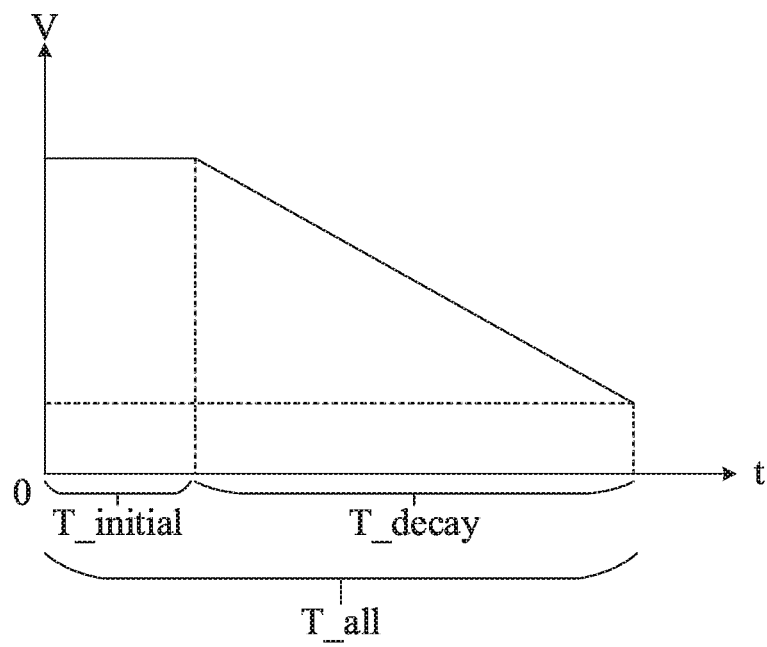
FIG. 4 is a structural schematic diagram of a second processing result after amplifying according to an embodiment of the present application.

Wherein, the amplified second processing result can be as shown in FIG. 4. It should be explained that because of driving capacity insufficiency of the second processing result output by the decoder 202, the second processing result is required to be amplified by a proportional amplifier 203 before it is output. It can be understood that the amplified second processing result will have better driving capacity and load capacity.

As described above, a data processing method of a driving circuit according to embodiments of the present application includes obtaining the timing parameter; performing data processing based on the timing parameter, and obtaining a first processing result; decoding the first processing result according to the preset reference voltage, and obtaining a second processing result; and amplifying the second processing result, and outputting the amplified second processing result. A time-varying voltage signal can be produced through the present approach, and the voltage signal is used to regulate light-emitting conditions of micro-LEDs, reducing wear of the micro-LEDs over its operational lifespan, thereby preventing the micro-LEDs from experiencing color shift over time.

Referring to FIG. 5, FIG. 5 is a structural schematic diagram of a driving circuit according to an embodiment of the present application. The driving circuit 200 can include the controller 201, the decoder 202, and the proportional amplifier 203.

Wherein, the controller 201 can be configured to obtain the timing parameter, perform data processing based on the timing parameter, and obtain a first processing result.

Wherein, the decoder 202 can be configured to decode the first processing result according to the preset reference voltage and obtain a second processing result.

Wherein, the proportional amplifier 203 can be configured to amplify the second processing result and output the amplified second processing result.

As shown in FIG. 6, in some embodiments, the controller 201 can include the timing module 2011 and the data processing module 2012.

Wherein, the timing module 2011 can be configured to obtain the timing parameter.

Wherein, the data processing module 2012 can be configured to perform the data processing based on the timing parameter and obtain the first processing result.

As described above, the driving circuit 200 according to embodiments of the present application obtains the timing parameter, performs data processing based on the timing parameter, and obtains the first processing result through the controller 201. A decoder 202 can be configured to decode the first processing result according to the preset reference voltage and obtain a second processing result. The proportional amplifier 203 can be configured to amplify the second processing result and output the amplified second processing result.

The time-varying voltage signal can be produced through the present approach, and the voltage signal is used to regulate the light-emitting conditions of the micro-LEDs, reducing wear of the micro-LEDs over its operational lifespan, thereby preventing the micro-LEDs from experiencing color shifting over time. Furthermore, because the proportional amplifier 203 has an effect of isolating successive stages of circuits, correctness of the amplified second processing result can be ensured when amplifying the second processing result.

In the above-mentioned embodiments, description for each embodiment has different emphases, and contents not described in detail in one embodiment can be referred to relevant description of other embodiments.

Detailed description of a data processing method of a driving circuit and a driving circuit according to embodiments of the present application is given above. It should be understood that illustrative embodiments described above are descriptive, intended to facilitate understanding of the approach and main idea of the present application, and not intended to limit the present application. Description of features or aspects in each illustrative embodiment should generally be considered to apply to similar features or aspects of other illustrative embodiments. Although illustrative embodiments describe the present application, they can suggest to those skilled in the art making variations and modifications. The present application intends to include the variations and modifications within the scope of the appended claims, and many changes and modifications to the described embodiments can be carried out without departing from the scope and the spirit of the present application that is intended to be limited only by the appended claims.

What is claimed is:

1. A data processing method of a driving circuit, comprising:
   obtaining a timing parameter;
   performing data processing based on the timing parameter to obtain a first processing result;
   decoding the first processing result according to a preset reference voltage to obtain a second processing result; and
   amplifying the second processing result and outputting the amplified second processing result,
   wherein the performing of the data processing based on the timing parameter to obtain the first processing result comprises:
      performing signal initialization processing and attenuation processing based on the timing parameter to obtain the first processing result; and
   wherein the timing parameter comprises a data processing time length, an initialization time length, and a maximum counting value; and
   the performing of the signal initialization processing and the attenuation processing based on the timing parameter to obtain the first processing result comprises:
      performing the signal initialization processing and the attenuation processing based on the data processing time length, the initialization time length, and the maximum counting value to obtain the first processing result.

2. The data processing method of the driving circuit as claimed in claim 1, wherein the performing of the signal initialization processing and the attenuation processing based on the data processing time length, the initialization time length, and the maximum counting value to obtain the first processing result comprises:
   performing the signal initialization processing according to a preset initialization start time and the initialization time length to obtain an initial input signal;
   performing the attenuation processing on the initial input signal according to the preset initialization start time, the initialization time length, the data processing time length, and the maximum counting value to obtain an attenuation signal; and
   taking the initial input signal and the attenuation signal as the first processing result.

3. The data processing method of the driving circuit as claimed in claim 2, wherein the performing of the attenuation processing on the initial input signal to obtain the attenuation signal comprises:
   performing a first sub-attenuation processing on the initial input signal based on the preset initialization start time, the initialization time length, and the maximum counting value to obtain a first sub-attenuation signal;
   determining an end time of the data processing according to the preset initialization start time and the data processing time length; and
   comparing the end time with a time corresponding to the maximum counting value to obtain a comparison result, and determining the attenuation signal according to the comparison result.

4. The data processing method of the driving circuit as claimed in claim 3, wherein the determining of the attenuation signal according to the comparison result comprises:

if the end time is equal to the time corresponding to the maximum counting value, taking the first sub-attenuation signal as the attenuation signal; and if the end time is greater than the time corresponding to the maximum counting value, performing a second sub-attenuation processing on the first sub-attenuation signal to obtain a second sub-attenuation signal, and taking the first sub-attenuation signal and the second sub-attenuation signal as the attenuation signal.

5. The data processing method of the driving circuit as claimed in claim 4, wherein the performing of the second sub-attenuation processing on the first sub-attenuation signal to obtain the second sub-attenuation signal comprises:

setting the first sub-attenuation signal to zero to obtain the second sub-attenuation signal.

6. The data processing method of the driving circuit as claimed in claim 3, wherein the performing of the first sub-attenuation processing on the initial input signal based on the preset initialization start time, the initialization time length, and the maximum counting value comprises:

determining the time corresponding to the maximum counting value according to the preset initialization start time and the maximum counting value; and performing the first sub-attenuation processing on the initial input signal according to the preset initialization start time, the initialization time length, and the time corresponding to the maximum counting value.

7. The data processing method of the driving circuit as claimed in claim 1, wherein the decoding of the first processing result according to the preset reference voltage to obtain the second processing result comprises:

performing a digital-to-analog conversion on the first processing result according to the preset reference voltage to convert a digital signal into an analog signal to obtain the second processing result.

8. The data processing method of the driving circuit as claimed in claim 7, wherein the performing of the digital-to-analog conversion on the first processing result to obtain the second processing result comprises:

comparing the preset reference voltage with the first processing result to convert the digital signal into the analog signal, thereby obtaining the second processing result.

9. A driving circuit, comprising:
a controller configured to obtain a timing parameter, and perform data processing based on the timing parameter to obtain a first processing result;
a decoder configured to decode the first processing result according to a preset reference voltage to obtain a second processing result; and
a proportional amplifier configured to amplify the second processing result and output the amplified second processing result,
wherein the controller comprises:
a timer configured to obtain the timing parameter; and
a data processor configured to perform the data processing based on the timing parameter to obtain the first processing result; and
wherein the timing parameter comprises a data processing time length, an initialization time length, and a maximum counting value; and
the data processor is configured to perform signal initialization processing and attenuation processing based on the data processing time length, the initialization time length, and the maximum counting value to obtain the first processing result.

10. The driving circuit as claimed in claim 9, wherein the data processor is configured to:
perform the signal initialization processing according to a preset initialization start time and the initialization time length to obtain an initial input signal;
perform the attenuation processing on the initial input signal according to the preset initialization start time, the initialization time length, the data processing time length, and the maximum counting value to obtain an attenuation signal; and
take the initial input signal and the attenuation signal as the first processing result.

11. The driving circuit as claimed in claim 10, wherein the data processor is configured to:
perform the signal initialization processing according to the preset initialization start time and the initialization time length to obtain the initial input signal;
perform a first sub-attenuation processing on the initial input signal based on the preset initialization start time, the initialization time length, and the maximum counting value to obtain a first sub-attenuation signal;
determine an end time of the data processing according to the preset initialization start time and the data processing time length; and
compare the end time with a time corresponding to the maximum counting value to obtain a comparison result, and determine the first processing result according to the comparison result.

12. The driving circuit as claimed in claim 11, wherein the data processor is configured to:
perform the first sub-attenuation processing on the initial input signal based on the preset initialization start time, the initialization time length, and the maximum counting value to obtain the first sub-attenuation signal;
determine the end time according to the preset initialization start time and the data processing time length;
compare the end time with the time corresponding to the maximum counting value;
if the end time is equal to the time corresponding to the maximum counting value, take the initial input signal and the first sub-attenuation signal as the first processing result; and
if the end time is greater than the time corresponding to the maximum counting value, perform a second sub-attenuation processing on the first sub-attenuation signal to obtain a second sub-attenuation signal, and take the initial input signal, the first sub-attenuation signal, and the second sub-attenuation signal as the first processing result.

13. The driving circuit as claimed in claim 12, wherein the data processor is configured to:
perform the first sub-attenuation processing on the initial input signal based on the preset initialization start time, the initialization time length, and the maximum counting value to obtain the first sub-attenuation signal;
determine the end time according to the preset initialization start time and the data processing time length;
compare the end time with the time corresponding to the maximum counting value;
if the end time is equal to the time corresponding to the maximum counting value, take the initial input signal and the first sub-attenuation signal as the first processing result; and
if the end time is greater than the time corresponding to the maximum counting value, set the first sub-attenuation signal to zero to obtain the second sub-attenuation signal, and take the initial input signal, the first sub-attenuation signal, and the second sub-attenuation signal as the first processing result.

14. The driving circuit as claimed in claim 11, wherein the data processor is configured to:
perform the signal initialization processing according to the preset initialization start time and the initialization time length to obtain the initial input signal;
determine the time corresponding to the maximum counting value according to the preset initialization start time and the maximum counting value;
perform the first sub-attenuation processing on the initial input signal according to the preset initialization start time, the initialization time length, and the time corresponding to the maximum counting value to obtain the first sub-attenuation signal;
determine the end time according to the preset initialization start time and the data processing time length; and
compare the end time with the time corresponding to the maximum counting value to obtain the comparison result, and determine the first processing result according to the comparison result.

15. The driving circuit as claimed in claim 9, wherein the decoder is configured to perform a digital-to-analog conversion on the first processing result according to the preset reference voltage to convert a digital signal into an analog signal to obtain the second processing result.

16. The driving circuit as claimed in claim 15, wherein the decoder is configured to compare the preset reference voltage with the first processing result to convert the digital signal into the analog signal, thereby obtaining the second processing result.

17. A data processing method of a driving circuit, comprising:
obtaining a timing parameter;
performing data processing based on the timing parameter to obtain a first processing result;
decoding the first processing result according to a preset reference voltage to obtain a second processing result; and
amplifying the second processing result and outputting the amplified second processing result,
wherein the decoding of the first processing result according to the preset reference voltage to obtain the second processing result comprises:
comparing the preset reference voltage with the first processing result to convert a digital signal into an analog signal, thereby obtaining the second processing result.

* * * * *